United States Patent Office 2,986,879
Patented June 6, 1961

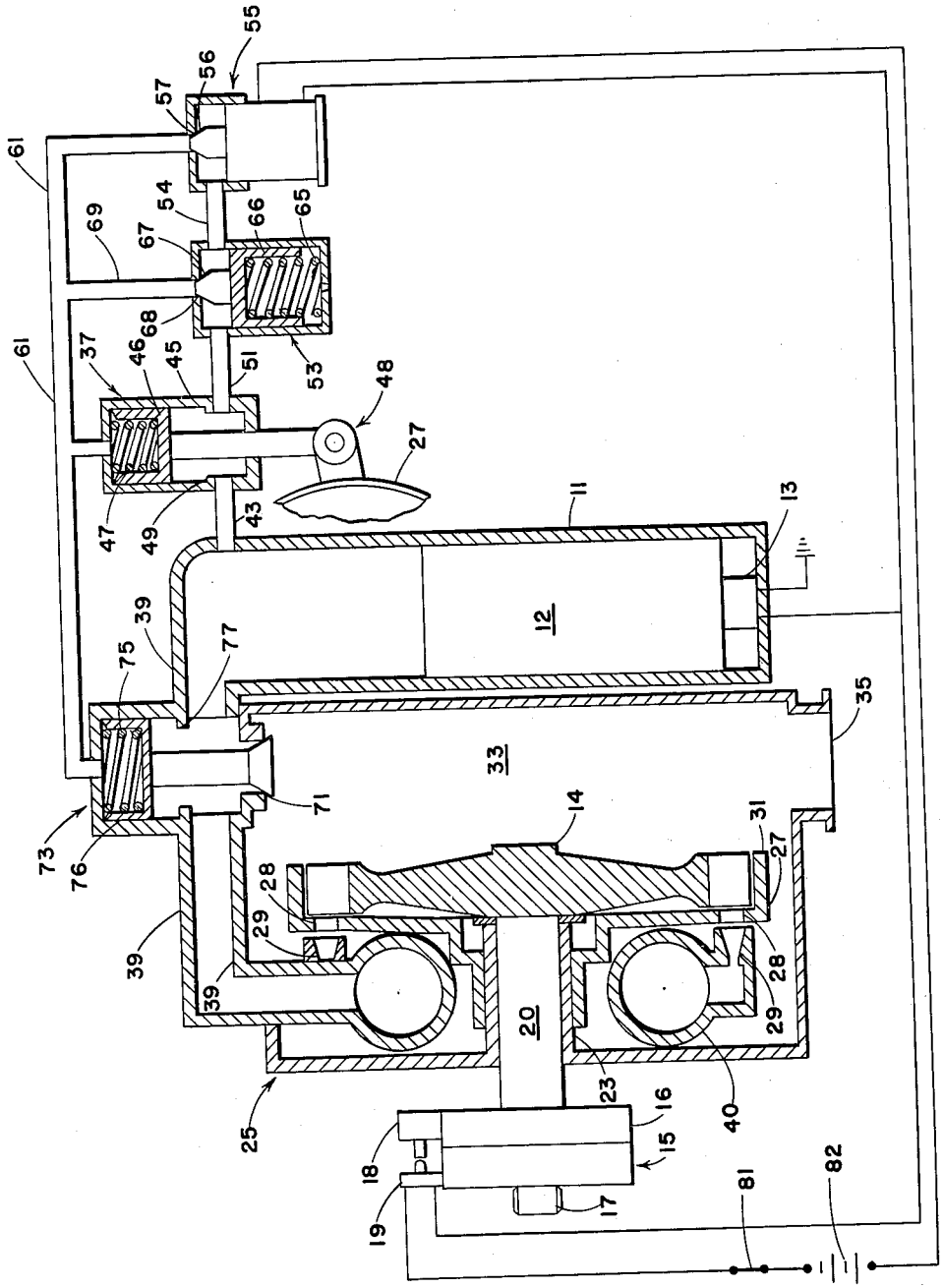

2,986,879
SOLID PROPELLANT STARTER
Emil A. Volk, Jr., Hasbrouck Heights, N.J., assignor to The Bendix Corporation, a corporation of Delaware
Filed June 12, 1957, Ser. No. 665,243
6 Claims. (Cl. 60—39.14)

The present invention relates to pneumatic starters for aircraft turbine engines and more particularly concerns such a starter in which a solid propellant cartridge provides gases for driving a turbine.

Solid propellant turbine starters require means to cut off the supply of gas to the turbine when starting speed is reached and also means to release gases if the pressure exceeds a predetermined safe level. It is also preferred that such means operate so as to rapidly prevent gases from rotating the turbine and so as to exhaust the excess gases or high pressure gases in safe manner.

An object of the present invention is to provide an improved starter having means for operating a gas cut-off plate adjacent the turbine nozzles when excess pressure is developed or when excess turbine speed exists.

A further object is to provide means for by-passing the gases flowing toward the turbine nozzles to the exhaust chamber after starting speed is achieved or when excess pressure is developed.

Another object is the provision of a starter having control system for a nozzle cut-off plate and a by-pass dump valve starter whereby operability of the cut-off plate control and of the by-pass valve control can be established at the beginning of the starting cycle.

An additional object is the provision of an improved solid propellant starter having a simply-arranged control system for a nozzle cut-off plate and a by-pass dump valve whereby both the plate and the valve function rapidly to prevent gases from rotating the turbine in response to excessive turbine speed or excessive gas pressure and whereby the excess gases or the high pressure gases are safely exhausted.

The accomplishment of the foregoing objects, along with the features and advantages of the present invention, will be apparent from the following detailed description and the accompanying schematic drawing showing the starter in operative stage.

Referring to the drawing, it can be seen that the basic components of the starter are the breech 11 containing an ammonium nitrate cartridge 12 and igniter 13, the bladed turbine 14 adapted to be rotated by gases from the breech 11, and the means 15 for transmitting the power of the turbine 14 to an aircraft turbint engine (not shown) for the purpose of starting the engine. The means 15 is comprised of conventional reduction gearing 16 and a conventional power train including clutch, jaw advancing mechanism, a starter jaw and an engine jaw. The engine jaw is attached within means 15 to the splined shaft 17 which is adapted for operative connection to the aircraft engine. A speed responsive device 18 having centrifugally-actuated flyballs is operatively geared to the reduction gearing 16 so that at a predetermined speed it will open the normally-closed switch 19. The speed responsive device 18 is shown with an actuating arm adapted to engage a button of the normally closed switch 19. A shaft 20 connects the turbine 14 to the reduction gearing 16.

Shaft 20 is rotatably mounted in an axial extension 23 of turbine housing 25. A nozzle gas cut-off plate 27 is rotatably mounted on the extension 23 and extends radially between the turbine and the nozzles. The annular nozzle plate 27 has a plurality of peripheral openings 28. These equi-spaced openings 28 permit gases from an equal number of nozzles 29 to impinge on the turbine buckets and rotate the axial flow impulse type turbine 14 during the starting cycle. The upper nozzle 29 appearing in the drawing is connected to the manifold 40 behind inlet conduit 39. The nozzle cut-off plate is rotated to the position shown for starting so that openings 28 are in alignment with nozzles 29. When such alignment does not exist, gases from the equi-spaced nozzles 29 will impinge upon the peripheral portions of nozzle plate between the openings 28 and will not be effective to rotate the turbine 14. It is to be noted that the nozzle cut-off plate 27 has a peripheral axially-extending flange 31 which covers the radially outer part of the turbine wheel 14. With this construction, when the openings are not aligned with the nozzles, the gases will flow over the cut-off plate and be directed by the housing 25 to the exhaust chamber 33 which has an exhaust outlet 35. The nozzle cut-off plate 27 is rotated in and out of alignment by the nozzle actuating mechanism 37 which is diagrammatically shown to the left of the breech 11. The breech 11 is connected by large conduit 39 to the annular nozzle manifold 40 which is arranged to supply gases to the nozzles 29. A similar nozzle cut-off plate is described in the Volk Patent No. 2,651,493.

Conduit 43 connects the top of the breech 11 to the bottom of the nozzle cut-off plate actuating mechanism 37. The actuating mechanism 37 is comprised of a cylinder 45 and a spring-biased piston 46. Piston 46 is normally urged downwardly by spring 47 against a stop shoulder 49 so as to position, through linkage 48, the cut-off plate with the openings thereof not aligned with nozzles 29. It is to be noted that the upper surface of the piston is larger in pressure responsive area than the lower surface adjacent the upper end of the linkage 48. As mentioned, the piston actuating mechanism 37 is shown schematically in relation to the cut-off plate. It is apparent that it is actually positioned so that linkage 48 extends tangentially through housing 25 and is connected to the plate so as to rotate the plate. It is to be noted that, when gases are generated in the breech and flow through conduit 43, the piston 46 will be urged upwardly in such a manner as to rotate the cut-off plate so that its openings 28 and the nozzles 29 are in alignment. A conduit 51 extends from the cut-off plate actuating mechanism to an excess pressure responsive control valve 53. Another conduit 54 extends from valve 53 to a speed responsive control solenoid valve 55.

Before initiating the starting cycle, speed responsive valve 55 is in open position. When the starter switch is closed, the solenoid of valve 55 is immediately energized and closes the valve 55. This is accomplished by valve member 56 contacting valve seat 57. It is to be noted that, with valve 55 closed, and after the cartridge 12 is ignited, the pressure on the bottom face of cut-off plate piston 46 will rapidly increase and exceed that on the other side of piston 46 so that spring-biased piston 46 is urged upwardly to give the aligning operation above described. Unless valve 55 is operable and closed in this manner, it is apparent that there would be pressure on each side of piston 46 and the cut-off plate will remain out of alignment because of the urging of the spring and the larger top surface of piston 46. This pressure unbalancing will occur because gases pass by a conduit 43, cylinder 45, conduit 51, valve 55 and conduit 61 to the upper side of the piston 46 when valve 55 is open. It is also apparent that, when the speed responsive device 18 opens normally-closed switch 19, the solenoid of valve 55 will be de-energized and open valve 55. When this occurs, there will be pressure unbalancing on piston 46 and this, together with spring 47, will urge the cut-off plate out of alignment. Valve 55 permits venting of the pistons to the exhaust port after a starting cycle since it is then open.

The pressure control valve 53 is normally closed by spring 65 urging the piston 66 upwardly so that valve member 67 contacts valve seat 68 and hence closes off conduit 69. Spring 65 is of such strength that the force of the gas on piston 66 does not open this valve during normal operation. Only when the pressure of the gas exceeds the normal top operating pressure (500 p.s.i.g.) by a predetermined amount will piston 66 be urged downwardly to permit flow through conduit 69 and 61 to the nozzle cut-off plate actuating mechanism 37 so that said plate is moved out of alignment whereby the turbine will not be rotated when excessive pressure exists as sometimes occurs with a cracked or otherwise defective cartridge.

Referring to the conduit 39 which connects the breech to the nozzle manifold, it can be seen that there is a short, large-diameter passage 71 connecting conduit 39 to the exhaust chamber 33. This passage is closed by dump valve 73 during the starting cycle by having the conical head of valve 73 seat over the outlet of passage 71. Before starting, dump valve 73 is open due to spring 75 and the larger top surface of the piston 76. Piston 76 is normally urged downwardly against stop shoulder 77 extending from the cylinder of valve 73 so as to open valve 73. Dump valve 73 when open provides a restricted annular opening which provides form pressure build-up sufficient for closing. It is to be noted that dump valve 73 will be operated to open position in a manner identical to the cut-off plate actuating mechanism 37 when either pressure control valve 53 opens or when the speed control valve 55 opens so that a large part of the gases flowing in conduit 39 is diverted to the exhaust chamber.

The electrical circuit for operating the starter included the normally-open starting switch 81 and a source of electricity 82 which are connected in series with the previously-mentioned speed responsive switch 19 and the solenoid of valve 55. A branch circuit connects the igniter 13 to ground. With this circuit, it is apparent that the closing of starter switch 81 will permit current to flow through normally-closed switch 19 to the igniter 13 and to the solenoid of normally-open valve 55 so that the cartridge is ignited and burned and so that the valve 55 is closed upon initiation of the starting cycle. Thereafter, when the switch 19 is opened, valve 55 will be opened by de-energizing its solenoid so that gas can flow to upper sides of the pistons of the dump valve 73 and the cut-off plate actuating mechanism 37.

In operation, the closing of the starter switch 81 ignites the cartridge 12 and energizes the solenoid of valve 55 to close the speed responsive valve. Low pressure gases (50 p.s.i.g.), by moving pistons 46 and 76 upward, quickly move the cut-off plate 27 into operating position and close the dump valve 73. Higher pressure gases then rotate the turbine wheel 14 which brings the associated aircraft engine up to starting speed via torque transmitting means 15. Upon the turbine reaching starting speed, the normally closed governor switch 19 is opened so that the speed responsive valve 55 is de-energized and opened. This permits gas to flow to the unpressurized back of dump valve piston 76 and to the back of the actuating mechanism piston 46, simultaneously causing the dump valve 73 to open and the cut-off plate 27 to move out of alignment so that excess gases are rapidly prevented from rotating the turbine and are quickly and safely exhausted through exhaust port. If the cartridge (which is normally slow burning and generates a relatively medium pressure) improperly burns and gives a high dangerous pressure (above 500 p.s.i.g.), the pressure responsive valve 53 will open and permit gas to operate the cut-off plate and the dump valve as above described. Thus, when the breech pressure exceeds a predetermined safe level, gases bypass the turbine via the dump valve and by flowing over the cut-off plate.

It is to be noted that the cut-off plate is moved into the alignment and that the dump valve is closed each time that the starter is fired since the restrictions formed at the dump valve and nozzles provide pressure sufficient for operating with surge of pressurized gases. In this manner, the operability of each of these devices is established and subsequent operation is assured when cut-off speed is reached or when a dangerous pressure level is generated. If either control (cut-off plate or dump valve) fails to work, the gas from the nozzles will either pass harmlessly over the turbine wheel or will flow through the wheel at a very greatly reduced velocity causing no harm to the starter or airplane engine. It is to be noted that, when speed or excessive pressure operates the dump valve and the cut-off plate, the gases effectively bypass the turbine due to the size of the dump valve and the blocking effect of the cut-off plate.

It is to be understood that persons skilled in art can make changes in the disclosed embodiment of the invention without departing from the invention as set forth in the appended claims.

What is claimed is:

1. A gas turbine starter comprised of a peripherally-bladed turbine wheel, nozzles arranged to direct gases to said turbine wheel, means for supplying gases to said nozzles, means connected to said turbine wheel for transmitting starting torque to a turbine engine, a rotatable nozzle cut-off plate having openings for gases from said nozzles interposed between said nozzles and said turbine wheel, pneumatic operating means for said cut-off plate connected to said means for supplying gases, turbine speed responsive means arranged to actuate said pneumatic means only when said turbine wheel rotates at a predetermined speed, said pneumatic operating means when actuated being constructed to move said cut-off plate to full cut-off position, said pneumatic means including an operating piston device having a large area side and a smaller area side, said smaller area side being in open communication with said means for supplying gases and said large area side being connectible through said speed responsive means to said means for supplying gases.

2. A solid propellant starter for turbine engines comprised of a breech chamber for a solid propellant cartridge, means including a bladed turbine wheel for rotating a turbine engine to starting speed, gas nozzles arranged to direct gases so as to rotate said turbine wheel, a gas cut-off plate between said blades and said nozzles having openings adapted to be aligned with said nozzles and adapted to interrupt gas flow to said nozzles when not aligned, means for passing gas from said breech to said nozzles, exhaust means arranged to receive gas from said turbine wheel and from said nozzles when said cut-off plate interrupts the flow from said nozzles to said turbine wheel, means including a normally-open dump valve providing communication between said means for passing gas and said exhaust means, said normally-open dump valve having an actuating piston, said dump valve actuating piston having one face thereof in communication with said means for passing gas and being arranged to close said dump valve when gas at a low pressure is in said means for passing gas, conduit means for passing gas from upstream of said gas nozzles to the other face of said dump valve actuating piston, said conduit means including a pressure responsive valve and a turbine speed responsive valve arranged so that said dump valve is opened when an unsafe gas pressure exists or when an unsafe turbine speed exists, said cut-off plate normally being out of alignment with said nozzles so as to be in a flow-interrupting position, an operating mechanism for said cut-off plate including an operating piston, said cut-off plate operating piston having one face thereof responsive to gas upstream of said gas nozzles and being arranged so that said cut-off plate is positioned in alignment with said turbine gas nozzles when gas upstream of said nozzles is at a low pressure, gas passage means including said pressure responsive valve and said turbine speed responsive valve for passing gas from upstream of said gas nozzles to the other face of said cut-off plate operating piston so that said cut-off plate is moved out of alignment with said gas nozzles when an unsafe gas pressure exists or when an unsafe turbine speed exists, whereby, when the turbine attains an excessive speed or when a dangerous pressure exists, gas simultaneously is diverted from said turbine wheel by said cut-off plate to said exhaust means and is diverted from upstream of said gas nozzles through said dump valve to said exhaust means.

3. A solid propellant starter for turbine engines comprised of a breech chamber for a solid propellant cartridge, means including a bladed turbine wheel and reduction gearing for rotating a turbine engine to starting speed, gas nozzles arranged to direct gases so as to rotate said turbine wheel, a gas cut-off plate between said nozzles and said turbine having openings adapted to be aligned with said nozzles and adapted to interrupt gas flow to said nozzles when not aligned, said cut-off plate having a flange extending over the outer part of said turbine wheel, means for passing gas from said breech to said nozzles, exhaust means arranged to receive gas from said turbine wheel and from said nozzles when said cut-off plate interrupts the flow from said nozzles to said turbine wheel, means including a normally-open, spring-biased dump valve providing communication between said means for passing gas and said exhaust means and constructed to pass a large part of the gases, said normally-open dump valve having an actuating piston, said dump valve actuating piston having one face thereof in communication with said means for passing gas and being arranged to close said dump valve when gas at a low pressure is in said means for passing gas, conduit means for passing gas from upstream of said gas nozzles to the other face of said dump valve actuating piston, said conduit means including a spring-biased pressure responsive valve and a turbine speed responsive solenoid valve arranged so that said dump valve is opened when an unsafe gas pressure exists or when an unsafe turbine speed exists, the solenoid of said turbine speed responsive valve being electrically connected in series to a normally-closed switch which is opened by a speed responsive device geared to said reduction gearing, said cut-off plate normally being out of alignment with said nozzles so as to be in a flow-interrupting position, a spring-biased operating mechanism for said cut-off plate including an operating piston, said cut-off plate operating piston having one face thereof responsive to gas upstream of said gas nozzles and being arranged so that said cut-off plate is positioned in alignment with said turbine gas nozzles when gas upstream of said nozzles is at a low pressure, gas passage means including said pressure responsive valve and said turbine speed responsive valve for passing gas from upstream of said gas nozzles to the other face of said cut-off plate operating piston so that said cut-off plate is moved out of alignment with said gas nozzles when an unsafe gas pressure exists or when an unsafe turbine speed exists, whereby, when the turbine attains an excessive speed or when a dangerous pressure exists, gas simultaneously is diverted over said turbine wheel by said cut-off plate to said exhaust means and is diverted from upstream of said gas nozzles through said dump valve to said exhaust means.

4. In a gas turbine starter having a bladed turbine wheel, a turbine exhaust chamber, conduit means for supplying gases to the turbine wheel, and means connected to the turbine wheel for starting connection to a turbine engine, the improvement comprised of diverting means operable to pass rapidly gases flowing toward the turbine to the exhaust chamber, pneumatic operating means for operating said diverting means connected to said conduit means, turbine speed responsive means arranged to actuate said pneumatic operating means at a predetermined speed of the turbine wheel, pressure responsive means connected to the conduit means arranged to actuate said pneumatic operating means when the pressure of gases in said conduit means exceeds a predetermined pressure, said speed means and said pressure means being arranged to actuate said operating means only when said speed or said pressure are sensed whereby said diverting means is operative only at said speed or said pressure.

5. A starter for turbine engines comprised of means including a bladed turbine wheel for rotating a turbine engine to starting speed, gas nozzles arranged to direct gases so as to rotate said turbine wheel, a gas cut-off plate between said wheel and said nozzles having openings adapted to be aligned with said nozzles and adapted to interrupt gas flow to said nozzles when not aligned, means for passing gas to said nozzles, exhaust means arranged to receive gas from said turbine wheel and from said nozzles when said cut-off plate interrupts the flow from said nozzles to said turbine wheel, said cut-off plate normally being out of alignment with said nozzles so as to be in a flow-interrupting position, an operating mechanism for said cut-off plate including a spring-biased operating piston, said cut-off plate operating piston having a large area face and a smaller area face, said smaller area face being responsive to gas pressure upstream of said gas nozzles and being arranged so that said cut-off plate is positioned in alignment with said turbine gas nozzles when gas upstream of said nozzles is at a low pressure, gas passage means including a pressure responsive valve and a turbine speed responsive valve for passing gas to the large area face of said cut-off plate operating piston from upstream of said gas nozzles when an unsafe gas pressure exists or when an unsafe turbine speed exists, whereby, when the turbine attains an excessive speed or when a dangerous pressure exists, gas is diverted from said turbine wheel by said cut-off plate to said exhaust means.

6. A starter for turbine engines comprised of a means including a bladed turbine wheel for rotating a turbine engine to starting speed, gas nozzles arranged to direct gases so as to rotate said turbine wheel, a gas cut-off plate between said nozzles and said turbine having openings with said nozzles an adapted to interrupt gas flow to said nozzles when not aligned, means for passing gas to said nozzles, exhaust means arranged to receive gas from said turbine wheel and from said nozzles when said cut-off plate interrupts the flow from said nozzles to said turbine wheel, dump valve means when opened providing communication between said means for passing gas and said exhaust means, said dump valve means being arranged to open when pressurized, conduit means for passing gas from upstream of said gas nozzles to said dump valve means, said conduit means including a spring-biased pressure responsive valve and a turbine speed responsive solenoid valve arranged so that said dump valve means is moved to open position when an unsafe gas pressure exists or when an unsafe turbine speed exists, said cut-off plate normally being out of alignment with said nozzles so as to be in a flow-interrupting position, a pneumatic operating mechanism for said cut-off plate being arranged when pressurized so that said cut-off plate is positioned out of alignment with said turbine gas nozzles, gas passage means including said pressure responsive valve and said turbine speed responsive valve for passing gas from upstream of said gas nozzles to said cut-off plate operating mechanism so that said cut-off plate is moved out of alignment with said gas nozzles when an unsafe gas pressure exists or when an unsafe turbine speed exists, whereby, when the turbine attains an excessive speed or when a dangerous pressure exists, gas simultaneously is diverted over said turbine wheel by said cut-off plate to said exhaust means and is diverted from upstream of said gas nozzles through said dump valve to said exhaust means.

References Cited in the file of this patent

UNITED STATES PATENTS

| | | |
|---|---|---|
| 1,816,787 | Moss | July 28, 1931 |
| 2,206,723 | Graham et al. | July 2, 1940 |
| 2,559,006 | Clapham | July 3, 1951 |
| 2,651,493 | Volk | Sept. 8, 1953 |
| 2,816,731 | Dantowitz | Dec. 17, 1957 |
| 2,842,937 | Clark | July 15, 1958 |